(12) United States Patent
Asif Bashir et al.

(10) Patent No.: US 10,777,219 B1
(45) Date of Patent: Sep. 15, 2020

(54) WRITE HEADS CONFIGURED TO REDIRECT CURRENT

(71) Applicant: Western Digital Technologies, Inc., San Jose, CA (US)

(72) Inventors: Muhammad Asif Bashir, San Jose, CA (US); Yaguang Wei, Pleasanton, CA (US); Petrus Antonius Van Der Heijden, Cupertino, CA (US); Xinjiang Shen, Fremont, CA (US); Terence Lam, Cupertino, CA (US); Zhigang Bai, Fremont, CA (US); Youfeng Zheng, San Jose, CA (US); Changqing Shi, San Ramon, CA (US); Michael Kuok San Ho, Emerald Hills, CA (US); Jian-Gang Zhu, San Jose, CA (US); Lijie Guan, San Jose, CA (US); Venkatesh Chembrolu, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/450,111

(22) Filed: Jun. 24, 2019

Related U.S. Application Data

(60) Provisional application No. 62/771,385, filed on Nov. 26, 2018.

(51) Int. Cl.
*G11B 5/11* (2006.01)
*G11B 5/187* (2006.01)
(52) U.S. Cl.
CPC ............... *G11B 5/11* (2013.01); *G11B 5/187* (2013.01)

(58) Field of Classification Search
CPC ..... G11B 5/314; G11B 5/3929; G11B 5/2912; G11B 5/012; G11B 2005/0024; G11B 5/11; G11B 5/187
See application file for complete search history.

(56) References Cited

U.S. PATENT DOCUMENTS

| | | | |
|---|---|---|---|
| 8,179,747 B1 * | 5/2012 | Mugino | G11B 5/314 360/59 |
| 8,582,240 B1 | 11/2013 | Chen et al. | |

(Continued)

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

*Primary Examiner* — Brian E Miller
(74) *Attorney, Agent, or Firm* — Patterson & Sheridan, LLP; Steven Versteeg

(57) ABSTRACT

Embodiments of the present disclosure generally relate to data storage devices, and more specifically, to storage devices employing an energy-assisted magnetic recording write head. The write head may comprise a main pole, a trailing shield, a conducting gap disposed between the main pole and the trailing shield, and one or more current blockers. The conducting gap may be conformal with the main pole. The one or more current blockers may be configured to direct the current from the main pole to the trailing shield through the conducting gap. The one or more current blockers may be further configured to recess the conducting gap away from the media facing surface. The one or more (Continued)

current blockers may be configured to direct the current away from a media facing surface of the write head.

20 Claims, 6 Drawing Sheets

(56) References Cited

U.S. PATENT DOCUMENTS

| | | | |
|---|---|---|---|
| 9,001,465 B1 * | 4/2015 | Shimizu | G11B 5/53 360/125.3 |
| 9,230,571 B1 | 1/2016 | Chen et al. | |
| 9,275,672 B2 | 3/2016 | Shiroishi et al. | |
| 9,355,655 B1 * | 5/2016 | Udo | G11B 5/1278 |
| 9,368,135 B2 | 6/2016 | Gao | |
| 9,478,242 B1 * | 10/2016 | Liu | G11B 5/3116 |
| 9,792,933 B2 * | 10/2017 | Koizumi | G11B 5/1278 |
| 9,881,637 B1 | 1/2018 | Wilson et al. | |
| 10,121,497 B1 | 11/2018 | Takahashi et al. | |
| 10,181,334 B1 * | 1/2019 | Song | G11B 5/314 |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,446,178 B1 * | 10/2019 | Tang | G11B 5/21 |
| 2008/0205202 A1 * | 8/2008 | Komura | G11B 5/314 369/13.02 |
| 2008/0239541 A1 * | 10/2008 | Shimazawa | G11B 5/314 360/59 |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2013/0114384 A1 * | 5/2013 | Mochizuki | G11B 5/314 369/13.15 |
| 2013/0250456 A1 | 9/2013 | Yamada et al. | |
| 2014/0139952 A1 | 5/2014 | Takeo et al. | |
| 2014/0177092 A1 * | 6/2014 | Katada | G11B 5/314 360/75 |
| 2014/0177100 A1 | 6/2014 | Sugiyama et al. | |
| 2015/0092292 A1 * | 4/2015 | Furukawa | G11B 5/314 360/59 |
| 2016/0027455 A1 | 1/2016 | Kudo et al. | |
| 2017/0092304 A1 * | 3/2017 | Koizumi | G11B 5/3173 |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

* cited by examiner

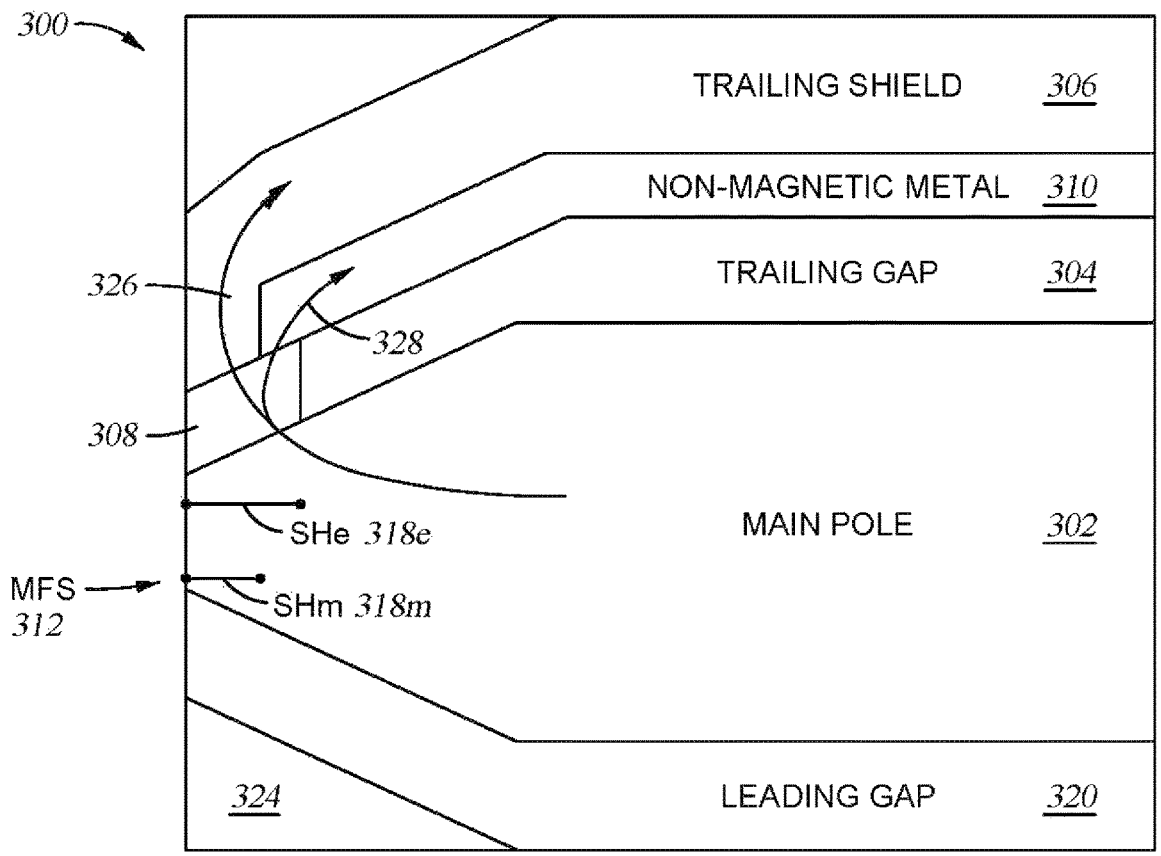
*Fig. 3A*
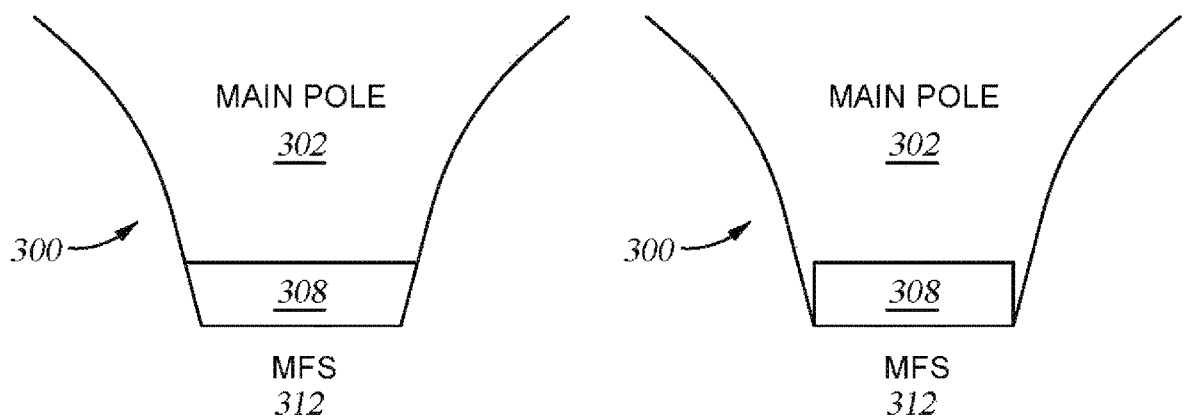
*Fig. 3B*  *Fig. 3C*

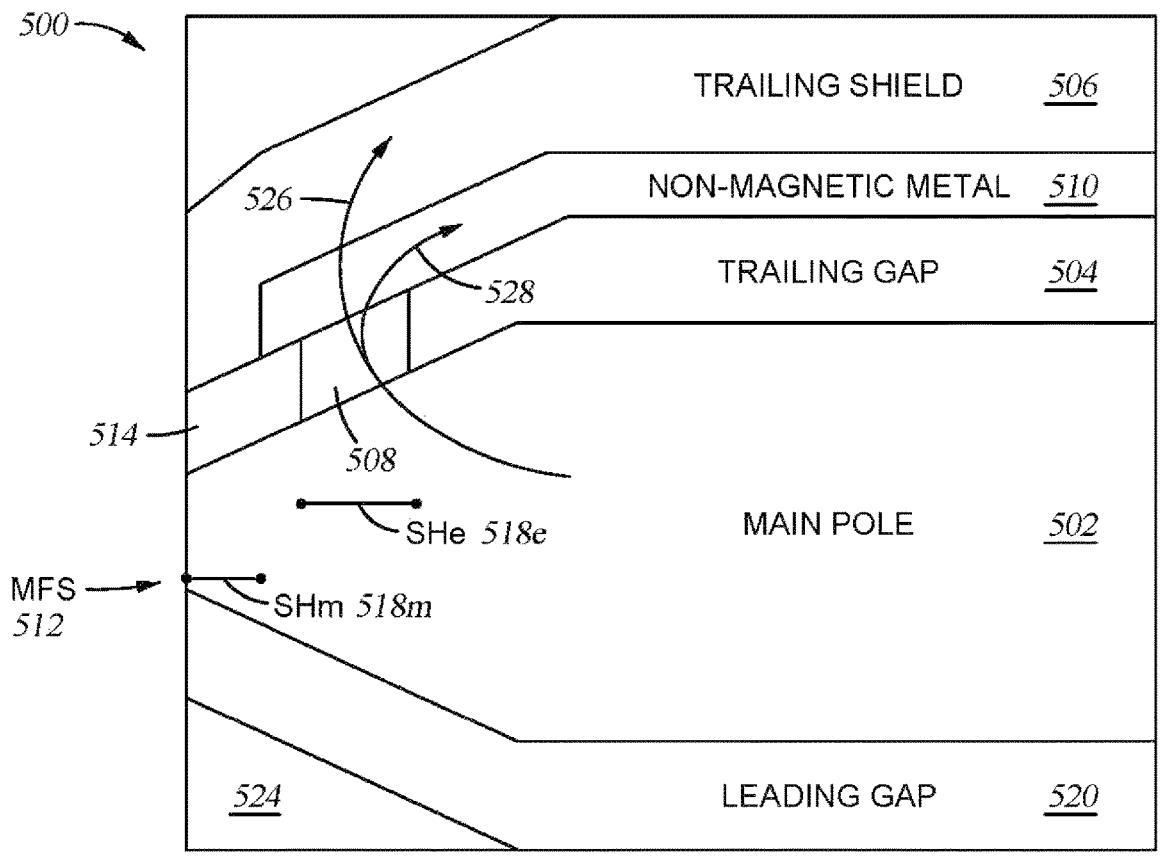
Fig. 5A
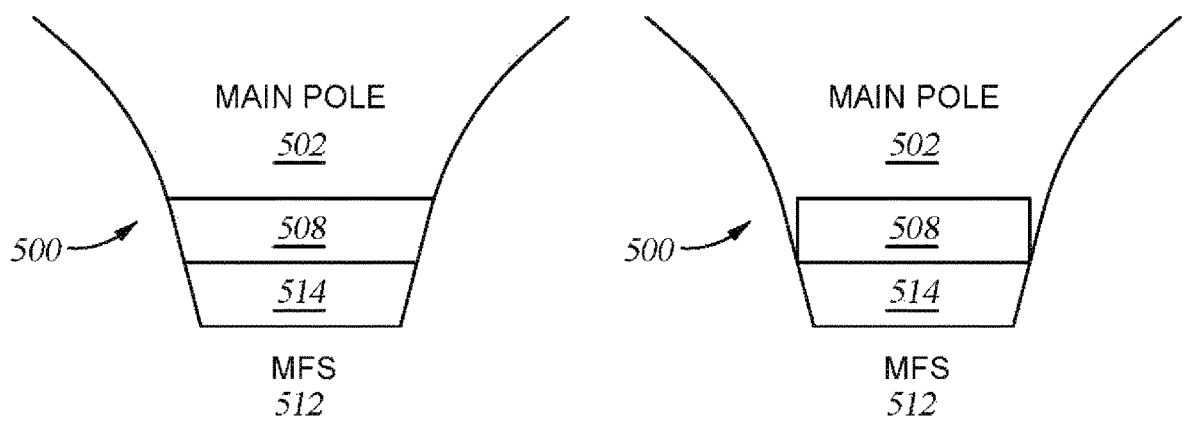
Fig. 5B
Fig. 5C

WRITE HEADS CONFIGURED TO REDIRECT CURRENT

CROSS-REFERENCE TO RELATED APPLICATIONS

This application claims the benefit of U.S. Provisional Patent Application Ser. No. 62/771,385, filed Nov. 26, 2018, which is herein incorporated by reference.

BACKGROUND OF THE DISCLOSURE

Field of the Disclosure

Embodiments of the present disclosure generally relate to data storage devices, and more specifically, to a magnetic media drive employing a write head.

Description of the Related Art

Over the past few years, various magnetic recording methods have been studied to improve the areal density of a magnetic media device, such as a hard disk drive (HDD). Write heads in HDDs can have a significant effect on the overall performance and reliability of the recording device. Write heads may be designed to achieve specific advantages, such as improved performance, but may consequently have a negative impact on other characteristics, such as decreased reliability.

For example, HDD designs where a current applied through the write head is used to write data to media, higher amounts of current being applied to the write head cause the temperature of the write head to increase. Due to the amount of heat being generated, the current flowing through the write head can cause the write head to degrade at the media facing surface (MFS). As the main pole degrades at the MFS, the performance and reliability of the write head decreases. As the current causes the write head to increasingly heat up, the write head may eventually deform or break down, rendering the write head inoperable. Thus, many write heads are unable to handle larger amounts of current without breaking down.

Therefore, there is a need in the art for an improved write head design.

SUMMARY OF THE DISCLOSURE

Embodiments of the present disclosure generally relate to data storage devices, and more specifically, to storage devices employing an energy-assisted magnetic recording (EAMR) write head, which may include a microwave-assisted magnetic recording (MAMR) write head. The write head may comprise a main pole, a trailing shield, a conducting gap disposed between the main pole and the trailing shield, and one or more current blockers. The conducting gap may be conformal with the main pole. The one or more current blockers may be configured to direct the current from the main pole to the trailing shield through the conducting gap. The one or more current blockers may be further configured to recess the conducting gap away from the media facing surface. The one or more current blockers may be configured to direct the current away from a media facing surface of the write head.

In one embodiment, a write head comprises a trailing shield, a main pole disposed adjacent to the trailing shield, and a first current blocker disposed on the main pole. The first current blocker is disposed at a media facing surface. A conducting gap is disposed adjacent to the first current blocker and recessed from the media facing surface. The conducting gap extends from the main pole to the trailing shield. The first current blocker is configured to recess the conducting gap away from the media facing surface.

In yet another embodiment, a write head comprises a main pole, a trailing shield disposed adjacent to the main pole, and a conducting gap disposed between the main pole and the trailing shield. The conducting gap has a first end disposed at a media facing surface and a second end opposite the media facing surface. A first current blocker is disposed on the main pole. The first current blocker is disposed at the media facing surface, and the first current blocker is shorter than the conducing trailing gap. A non-magnetic metal layer is disposed on the main pole. The non-magnetic metal layer is recessed from the media facing surface, and the non-magnetic metal layer overlaps with a portion of the conducting gap. A second current blocker is disposed on the non-magnetic metal layer. The second current blocker is aligned with the second end of the conducting gap. A current channel is defined between the first current blocker and the second current blocker.

In one embodiment, a storage device comprises a write head. The write head comprises a main pole, a trailing shield disposed adjacent to the main pole, and a conducting gap disposed between the main pole and the trailing shield. The conducting gap is conformal with the main pole, and the conducting gap has a first end disposed at a media facing surface. A non-magnetic metal layer is disposed on the main pole, wherein the non-magnetic metal layer is recessed from the media facing surface. The non-magnetic metal layer overlaps with a portion of the conducting gap.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3C illustrate various views of a write head, according to one embodiment.

FIGS. 5A-5C illustrate various views of a write head, according to yet another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to data storage devices, and more specifically, to storage devices employing an energy-assisted magnetic recording (EAMR) write head, which may include a microwave-assisted magnetic recording (MAMR) write head. The write head may comprise a main pole, a trailing shield, a conducting gap disposed between the main pole and the trailing shield, and one or more current blockers. The conducting gap may be conformal with the main pole. The one or more current blockers may be configured to direct the current from the main pole to the trailing shield through the conducting gap. The one or more current blockers may be further configured to recess the conducting gap away from the media facing surface. The one or more current blockers may be configured to direct the current away from a media facing surface of the write head.

Figure 1:
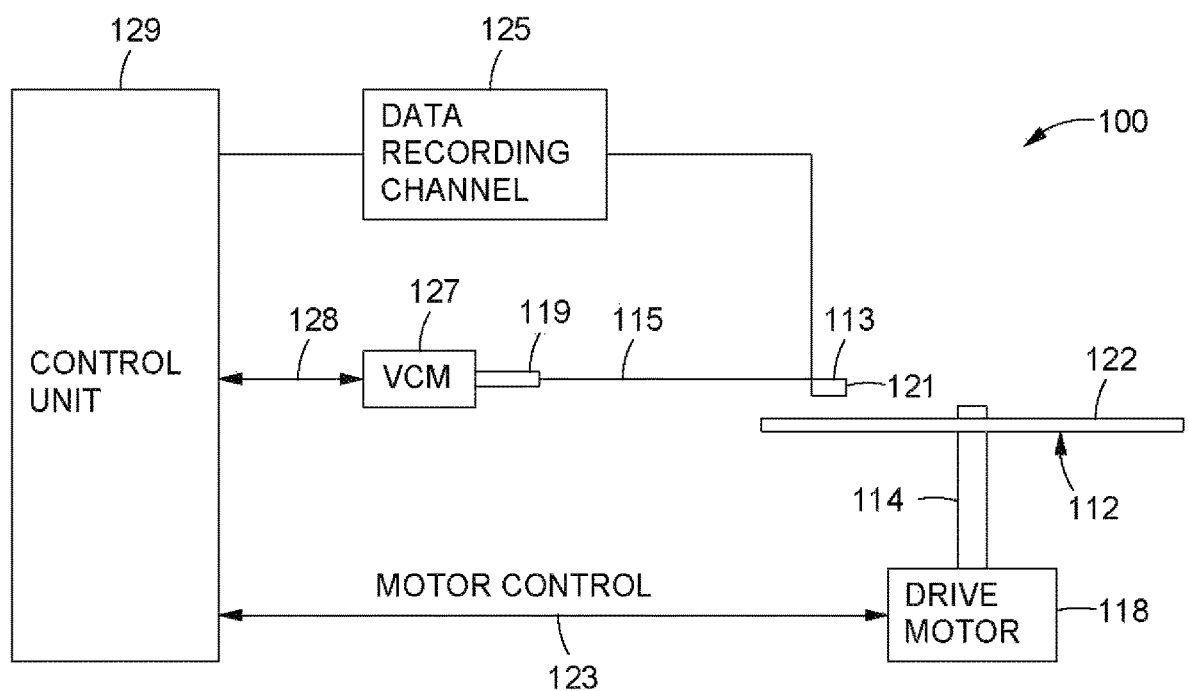
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
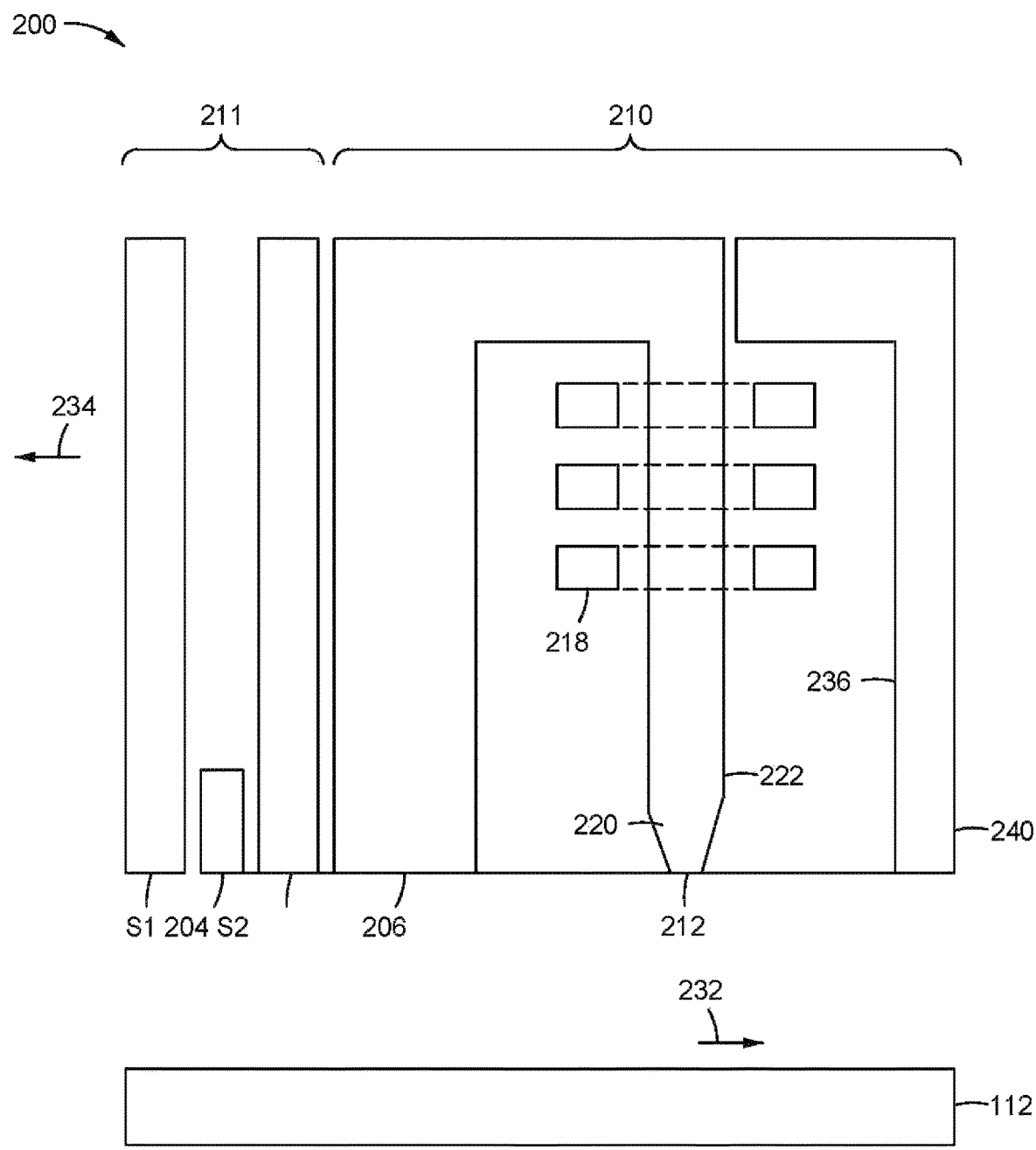
FIG. 2 is a fragmented, cross sectional side view through the center of a read/write head facing the magnetic media.

FIG. 2 is a fragmented, cross sectional side view through the center of a read/write head 200 facing the magnetic media 112. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head, such as a microwave-assisted magnetic recording (MAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

FIGS. 3A-3C illustrate various views of a write head 300, according to one embodiment. The write head 300 may be the write head 210 of FIG. 2. The write head 300 includes a main pole 302 and a trailing shield 306. The main pole 302 may be the main pole 220 of FIG. 2, and the trailing shield 306 may be the trailing shield 240 of FIG. 2. The MFS 312 may be the MFS 212 of FIG. 2. The write head 300 may be an EAMR write head such as a MAMR write head.

FIG. 3A illustrates a cross-sectional view of the write head with the main pole 302 disposed at the MFS 312. The main pole 302 comprises a leading gap 320 disposed adjacent a leading shield 324 and a trailing gap 304 disposed adjacent the trailing shield 306. The trailing gap 304 is recessed from the MFS. The trailing gap 304 may comprise a dielectric material, such as alumina. A conducting gap 308 is disposed at the MFS 312 adjacent the trailing gap 304. The conducting gap 308 and the trailing gap 304 may have the same width.

The conducting gap 308 has an electrical stripe height SHe 318e having a first surface disposed at the MFS 312 and a second surface disposed opposite the first surface. The electrical stripe height SHe 318e of the conducting gap 308 may have a length between about 20 nm to 150 nm, such as 100 nm. The length of the conducting gap 308, or the electrical stripe height SHe 318e, is shorter than the trailing gap 304. The conducting gap 308 may be comprised of ruthenium, or any other suitable combination of thin metallic layers. In one embodiment, the conducting gap 308 may be a spin torque oscillator comprising one and/or more magnetic layers and one or more non-magnetic layers, with or without a field generation layer.

A non-magnetic metal layer 310 is recessed from the MFS 312 and is disposed between the trailing shield 306 and the trailing gap 304 of the main pole 302. The non-magnetic metal layer 310 overlaps with a portion of the conducting gap 308. The non-magnetic metal layer 310 may be comprised of ruthenium or gold. A magnetic stripe height SHm 318m is defined between the MFS 312 and the non-magnetic metal layer 310. The electrical stripe height SHe 318e is longer than the magnetic stripe height SHm 318m.

When a voltage is applied to the write head 300, a current is configured to flow from the main pole 302 through the conducting gap 308 into the trailing shield 306, as shown by arrow 326. A portion of the current may be directed to flow into the non-magnetic metal layer 310, such as shown by arrow 328. The portion of the current directed into the non-magnetic metal layer 310 may disperse from the non-magnetic metal layer 310 into the trailing shield 306 the further the current flows from the MFS 312.

FIGS. 3B-3C illustrate top views of the write head 300, according to various embodiments. In FIG. 3B, the conducting gap 308 is conformal with the main pole 302 such that the conducting gap 308 and the main pole 302 have substantially the same shape. The conducting gap 308 may be tapered with the main pole 302. In FIG. 3C, the conducting gap 308 is non-conformal with the main pole 302. In other words, the conducting gap 308 and the main pole 302 have different shapes, with the conducting gap 308 being smaller in width or size than the main pole 302. The main pole 302 may be tapered while the conducting gap 308 may have a rectangular shape.

The write head 300 is capable of operating at higher currents while maintaining a low resistance and a low temperature rise. For example, in the embodiment of FIG. 3B with the write head 300 having a conformal conducting gap 308, the write head 300 has a maximum temperature of less than about 150 degrees Celsius when a current of 30 amperes is applied.

Figure 4A:
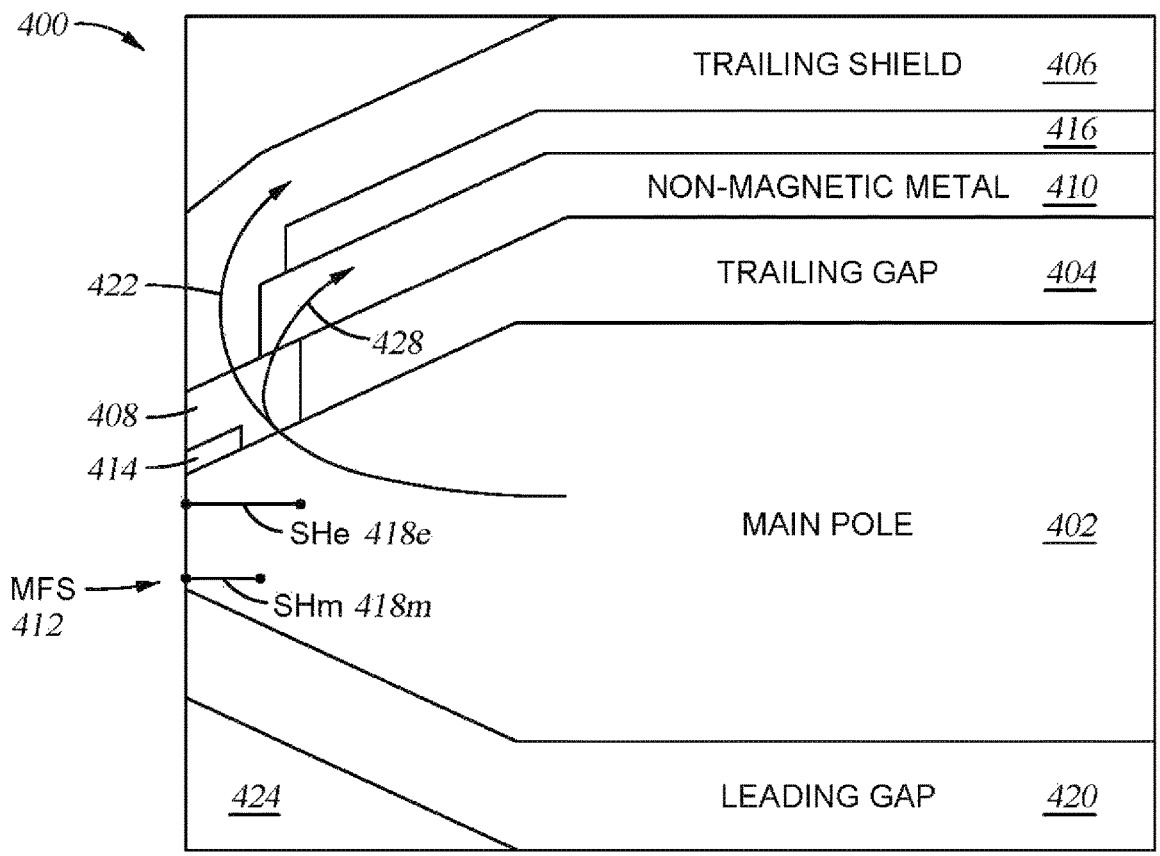
FIGS. 4A-4C illustrate various views of a write head, according to another embodiment.
Figures 4B, 4C:
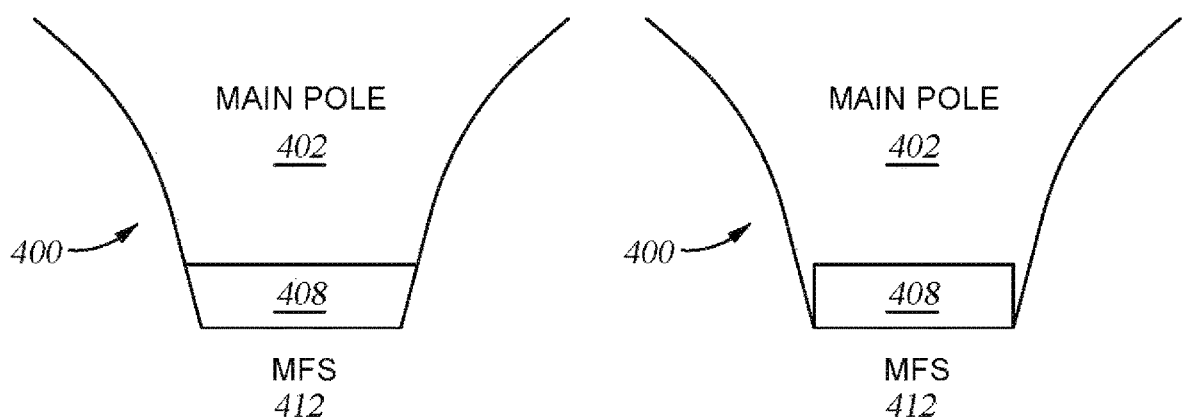

FIGS. 4A-4C illustrate various views of a write head 400, according to another embodiment. The write head 400 may be the write head 210 of FIG. 2. The write head 400 includes a main pole 402 and a trailing shield 406. The main pole 402 may be the main pole 220 of FIG. 2, and the trailing shield 306 may be the trailing shield 240 of FIG. 2. The MFS 412 may be the MFS 212 of FIG. 2. The write head 400 may be an EAMR write head such as a MAMR write head.

FIG. 4A illustrates a cross-sectional view of the write head 400 with the main pole 402 disposed at the MFS 412. The main pole 402 comprises a leading gap 420 disposed adjacent a leading shield 424 and a trailing gap 404 disposed adjacent the trailing shield 406. The trailing gap 404 is recessed from the MFS 412. The trailing gap 404 may comprise a dielectric material, such as alumina.

A conducting gap 408 is disposed at the MFS 412 adjacent the trailing gap 404. The conducting gap 408 may have an "L-like shape" such that a first portion of the conducting gap 408 has the same width as the trailing gap 404 and a second portion of the conducting gap has smaller width than the trailing gap 404. The conducting gap 408 has an electrical stripe height SHe 418e having a first surface disposed at the MFS 412 and a second surface disposed opposite the first surface. The electrical stripe height SHe 418e of the conducting gap 408 may have a length between about 20 nm to 150 nm, such as 100 nm. The length of the conducting gap 408, or the electrical stripe height SHe 418, is shorter than the trailing gap 404. The conducting gap 408 may be comprised of ruthenium, or any other suitable combination of thin metallic layers. In one embodiment, the conducting gap 408 may be a spin torque oscillator comprising one and/or more magnetic layers and one or more non-magnetic layers, with or without a field generation layer.

A non-magnetic metal layer 410 is recessed from the MFS and is disposed between the trailing shield 406 and the trailing gap 404 of the main pole 402. The non-magnetic metal layer 410 overlaps with a portion of the conducting gap 408. The non-magnetic metal layer 410 may be comprised of ruthenium or gold. A magnetic stripe height SHm 418m is defined between the MFS 412 and the non-magnetic metal layer 410. The electrical stripe height SHe 418e is longer than the magnetic stripe height SHm 418m.

A first current blocker 414 is disposed at the MFS 412 between the main pole 402 and the conducting gap 408. The first current blocker 414 has a length shorter than the conducting gap 408. The conducting gap 408 overlaps the first current blocker 414. A second current blocker 416 is disposed between the non-magnetic metal layer 410 and the trailing shield 406. The second current blocker 416 is recessed from the MFS 412, and is recessed further from the MFS 412 than the non-magnetic metal layer 410 such that the second current blocker 416 has a length shorter than the non-magnetic metal layer 410. In one embodiment, the second current blocker 416 has a width between about 2 nm to 10 nm, such as 5 nm. The first current blocker 414 and the second current blocker 416 may be comprised of the same material, such as alumina.

When a voltage is applied to the write head 400, a current is configured to flow from the main pole 402 into the trailing shield 406 through a current channel 422. The current channel 422 comprises a portion of the conducting gap 408, and is defined between the first current blocker 414 and the second current blocker 416. The current channel 422 further illustrates the flow of the current. A portion of the current may be directed to flow into the non-magnetic metal layer 410, as shown by arrow 428. The second current blocker 416 being disposed on the non-magnetic metal layer 410 prevents the current from flowing from the non-magnetic layer 410 into the trailing shield 406 as the current is directed to flow away from the MFS 412. Furthermore, the first current blocker

414 being disposed at the MFS 412 prevents the current from flowing to or near the MFS 412, which reduces the amount of heat generated at the MFS 412. Reducing the amount of heat generated at the MFS 412 helps prevent the main pole 402 from degrading at the MFS 412, prolonging the life of the main pole 402.

FIGS. 4B-4C illustrate top views of the write head 400, according to various embodiments. In FIG. 4B, the conducting gap 408 is conformal with the main pole 402 such that the conducting gap 408 and the main pole 402 have substantially the same shape. The conducting gap 408 may be tapered with the main pole 402. In FIG. 4C, the conducting gap 408 is non-conformal with the main pole 402. In other words, the conducting gap 408 and the main pole 402 have different shapes, with the conducting gap 408 being smaller in width or size than the main pole 402. The main pole 402 may be tapered while the conducting gap 408 may have a rectangular shape.

The write head 400 is capable of operating at higher currents while maintaining a low resistance and a low temperature rise. For example, in the embodiment of FIG. 4B with the write head 400 having a conformal conducting gap 408, the write head 400 has a maximum temperature of less than approximately 200 degrees Celsius when a current of 30 amperes is applied.

FIGS. 5A-5C illustrate various views of a write head 500, according to another embodiment. The write head 500 may be the write head 210 of FIG. 2. The write head 500 includes a main pole 502 and a trailing shield 506. The main pole 502 may be the main pole 220 of FIG. 2, and the trailing shield 506 may be the trailing shield 240 of FIG. 2. The MFS 512 may be the MFS 212 of FIG. 2. The write head 500 may be an EAMR write head, such as a MAMR write head.

FIG. 5A illustrates a cross-sectional view of the write head 500 with the main pole 502 disposed at the MFS 512. The main pole 502 comprises a leading gap 520 disposed adjacent the leading shield 524 and a trailing gap 504 disposed adjacent a trailing shield 506. The trailing gap 504 is recessed from the MFS 512. The trailing gap 504 may comprise a dielectric material, such as alumina. A non-magnetic metal layer 510 is recessed from the MFS 512 and is disposed between the trailing shield 506 and the trailing gap 504 of the main pole 502. The non-magnetic layer 510 overlaps the conducting gap 508 and has a greater length than the trailing gap 504. The non-magnetic metal layer 510 may be comprised of ruthenium or gold. A magnetic stripe height SHm 518*m* is defined between the MFS 512 and the non-magnetic metal layer 510.

A first current blocker 514 is disposed at the MFS 512 extending between the main pole 502 and the trailing shield 506. The first current blocker 514 is adjacent the trailing gap 504. The first current blocker 514 may be comprised of alumina. A conducting gap 508 is disposed between the first current blocker 514 and the trailing gap 504. The conducting gap 508 and the trailing gap 504 may have the same width. The first current blocker 514 is configured to recess the conducting gap 508 from the MFS 512. The conducting gap 508 has an electrical stripe height SHe 518*e* having a first surface recessed from the MFS 512 and a second surface disposed opposite the first surface. The electrical stripe height SHe 518*e* of the conducting gap 508 may have a length between about 20 nm to 150 nm, such as 100 nm. The length of the conducting gap 508, or the electrical stripe height SHe 518*e*, is shorter than the trailing gap 504. The electrical stripe height SHe 518*e* is longer than the magnetic stripe height SHm 518*m*. The conducting gap 508 may be comprised of ruthenium, or any other suitable combination of thin metallic layers. In one embodiment, the conducting gap 508 may be a spin torque oscillator comprising one or more magnetic layers and/or one or more non-magnetic layers, with or without a field generation layer.

When a voltage is applied to the write head 500, a current is configured to flow from the main pole through the conducting gap 508 into the trailing shield 506, as shown by arrow 526. A portion of the current may be directed to flow into the non-magnetic metal layer 510, as shown by arrow 528. The portion of the current directed into the non-magnetic metal layer 510 may disperse from the non-magnetic metal layer 510 into the trailing shield 506 the further the current flows from the MFS 512. Furthermore, the first current blocker 514 being disposed at the MFS 512 prevents the current from flowing to or near the MFS 512, which reduces the amount of heat generated at the MFS 512. Reducing the amount of heat generated at the MFS 512 helps prevent the main pole 502 from degrading at the MFS 512, prolonging the life of the main pole 502.

FIGS. 5B-5C illustrate top views of the write head 500, according to various embodiments. In FIG. 5B, the conducting gap 508 and the first current blocker 514 are conformal with the main pole 502 such that the conducting gap 508 and the main pole 502 have substantially the same shape. The conducting gap 508 and the first current blocker 514 may be tapered with the main pole 502. In FIG. 5C, the conducting gap 508 is non-conformal with the main pole 502. In other words, the conducting gap 508 and the main pole 502 have different shapes, with the conducting gap 508 being smaller in width or size than the main pole 502. The main pole 502 may be tapered while the conducting gap 508 may have a rectangular shape.

The write head 500 is capable of operating at higher currents while maintaining a low resistance and a low temperature rise. For example, in the embodiment of FIG. 5B with the write head 500 having a conformal conducting gap 508, the write head 500 has a maximum temperature of less than approximately 100 degrees Celsius when a current of 30 amperes is applied.

Figure 6A:
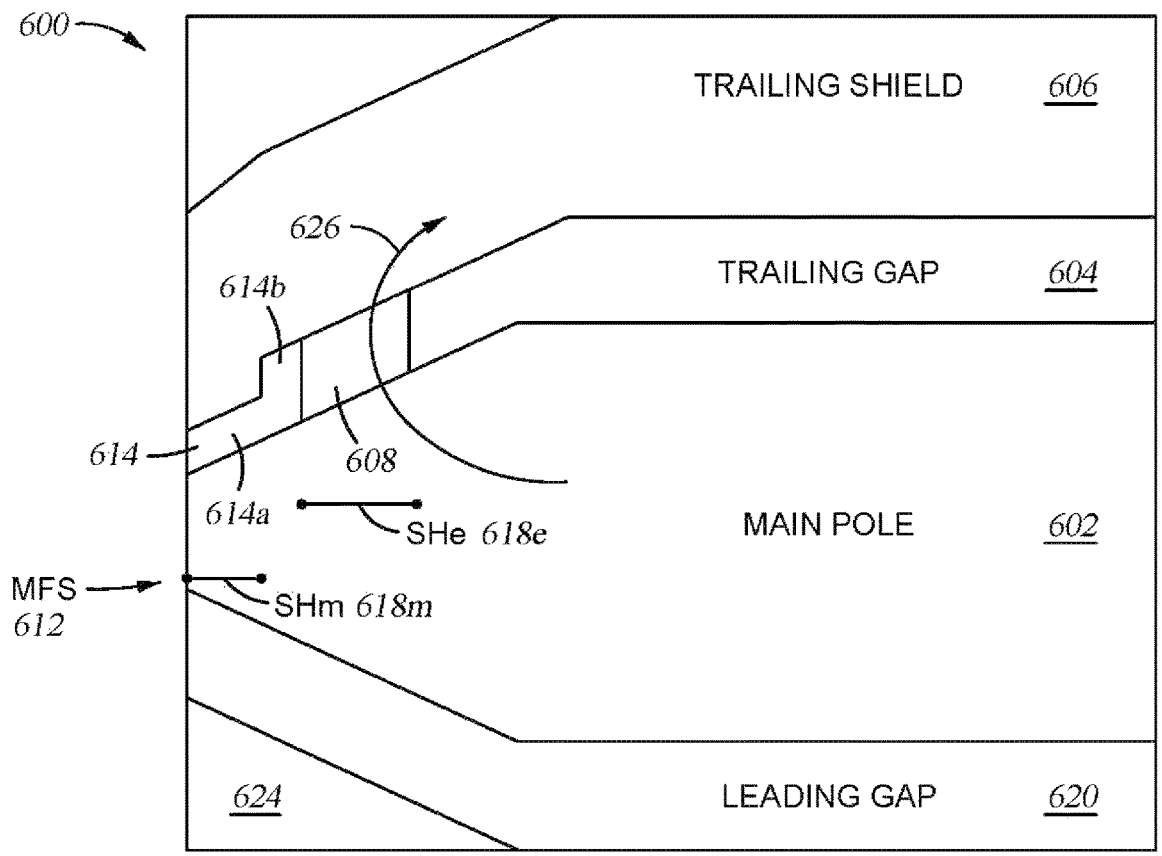
FIGS. 6A-6C illustrate various views of a write head, according to yet another embodiment.
Figures 6B, 6C:
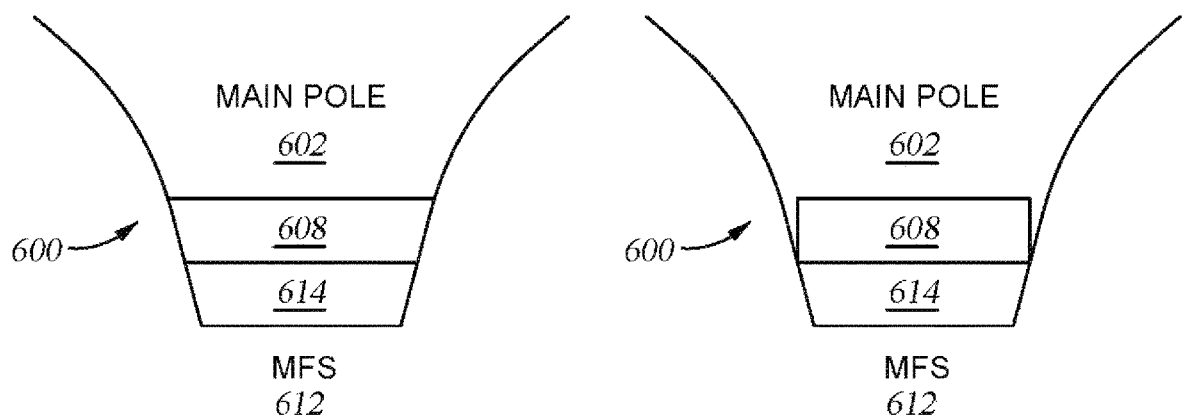

FIGS. 6A-6C illustrate various views of a write head 600, according to another embodiment. The write head 600 may be the write head 210 of FIG. 2. The write head 600 includes a main pole 602 and a trailing shield 606. The main pole 602 may be the main pole 220 of FIG. 2, and the trailing shield 606 may be the trailing shield 240 of FIG. 2. The MFS 612 may be the MFS 212 of FIG. 2. The write head 600 may be an EAMR write head such as a MAMR write head.

FIG. 6A illustrates a cross-sectional view of the write head 600 with the main pole 602 disposed at the MFS 612. The main pole 602 comprises a leading gap 620 disposed adjacent a leading shield 624 and a trailing gap 604 disposed adjacent the trailing shield 606. The trailing gap 604 is recessed from the MFS 612. The trailing gap 604 may comprise a dielectric material, such as alumina.

A first current blocker 614 is disposed at the MFS 612 extending between the main pole 602 and the trailing shield 606. The first current blocker 614 is adjacent the trailing gap 604. The first current blocker 614 may be comprised of alumina. A conducting gap 608 is disposed between the first current blocker 614 and the trailing gap 604. The first current blocker 614 is configured to recess the conducting gap 608 from the MFS 612. The first current blocker 614 may have an "L-like" shape, where a horizontal first portion 614*a* is longer and thinner than a vertical second portion 614*b*. The second portion 614*b* of the first current blocker 614 may be the same height as the conducting gap 608. A magnetic stripe height SHm 618*m* is defined between the MFS 412 and the second portion 614b of the first current blocker 614. The conducting gap 608 has an electrical stripe height SHe 618e having a first surface recessed from the MFS 612 and a second surface disposed opposite the first surface. The electrical stripe height SHe 618e of the conducting gap 608 may have a length between about 20 nm to 150 nm, such as 100 nm. The length of the conducting gap 608, or the electrical stripe height SHe 618e, is shorter than the trailing gap 604. The electrical stripe height SHe 618e is longer than the magnetic stripe height SHm 618m. The conducting gap 608 may be comprised of ruthenium, or any other suitable combination of thin metallic layers. In one embodiment, the conducting gap 608 may be a spin torque oscillator comprising one or more magnetic layers and/or one or more non-magnetic layers, with or without a field generation layer.

When a voltage is applied to the write head 600, a current is configured to flow from the main pole through the conducting gap 608 into the trailing shield 606, as shown by arrow 626. The first current blocker 614 blocks the current from flowing to or near the MFS 612, which reduces the amount of heat generated at the MFS 612. Reducing the amount of heat generated at the MFS 612 helps prevent the main pole 602 from degrading at the MFS 612, prolonging the life of the main pole 602.

FIGS. 6B-6C illustrate top views of the write head 600, according to various embodiments. In FIG. 6B, the conducting gap 608 and the first current blocker 614 are conformal with the main pole 602 such that the conducting gap 608 and the main pole 602 have substantially the same shape. The conducting gap 608 and the first current blocker 614 may be tapered with the main pole 602. In FIG. 6C, the conducting gap 608 is non-conformal with the main pole 602. In other words, the conducting gap 608 and the main pole 602 have different shapes, with the conducting gap 608 being smaller in width or size than the main pole 602. The main pole 602 may be tapered while the conducting gap 608 may have a rectangular shape.

The write head 600 is capable of operating at higher currents while maintaining a low resistance and a low temperature rise. For example, in the embodiment of FIG. 6B with the write head 600 having a conformal conducting gap 608, the write head 600 has a maximum temperature of less than 200 degrees Celsius when a current of 30 amperes is applied.

The performance and reliability of each of the write heads 300, 400, 500, and 600 is increased, as the write heads 300, 400, 500, and 600 are capable of operating with higher currents without increasing the resistance or temperature, and without the main pole degrading. Thus, the write heads 300, 400, 500, and 600 may have lower resistances and lower temperature increases in response to greater amounts of current being applied. Additionally, the electrical and magnetic stripe heights of the write heads 300, 400, 500, and 600 are decoupled to enhance current driven effects without compromising performance. Furthermore, each of the write heads 300, 400, 500, and 600 results in a higher bits per inch and areal density capacity being achieved.

In one embodiment, a write head comprises a trailing shield, a main pole disposed adjacent to the trailing shield, and a first current blocker disposed on the main pole. The first current blocker is disposed at a media facing surface. A conducting gap is disposed adjacent to the first current blocker and recessed from the media facing surface. The conducting gap extends from the main pole to the trailing shield. The first current blocker is configured to recess the conducting gap away from the media facing surface.

The conducting gap may be conformal with the main pole. The conducting gap may be non-conformal with the main pole. The first current blocker may comprise a first portion and a second portion, the first portion extending from the media facing surface to the second portion, and the second portion having a greater height than the first portion. The second portion of the first current blocker may be the same height as the conducting gap. A storage device may comprise the write head.

A non-magnetic metal layer may be disposed between the main pole and the trailing shield. The non-magnetic metal layer may be recessed from the media facing surface. The non-magnetic metal layer may overlap with a portion of the first current blocker, and the non-magnetic metal layer is disposed over the conducting gap. The conducting gap may be conformal with the main pole. The conducting gap may be non-conformal with the main pole. A storage device may comprise the write head.

In yet another embodiment, a write head comprises a main pole, a trailing shield disposed adjacent to the main pole, and a conducting gap disposed between the main pole and the trailing shield. The conducting gap has a first end disposed at a media facing surface and a second end opposite the media facing surface. A first current blocker is disposed on the main pole. The first current blocker is disposed at the media facing surface, and the first current blocker is shorter than the conducing gap. A non-magnetic metal layer is disposed on the main pole. The non-magnetic metal layer is recessed from the media facing surface, and the non-magnetic metal layer overlaps with a portion of the conducting gap. A second current blocker is disposed on the non-magnetic metal layer. The second current blocker is aligned with the second end of the conducting gap. A current channel is defined between the first current blocker and the second current blocker.

The conducting gap may be conformal with the main pole. The conducting gap may be non-conformal with the main pole. The second end of the conducting gap may have a smaller width than the main pole. The first current blocker and the second current blocker may be comprised of the same material. The first current blocker and the second current blocker may be comprised of alumina. The conducting gap may be disposed over the first current blocker. A storage device may comprise the write head.

In one embodiment, a storage device comprises a write head. The write head comprises a main pole, a trailing shield disposed adjacent to the main pole, and a conducting gap disposed between the main pole and the trailing shield. The conducting gap is conformal with the main pole, and the conducting gap has a first end disposed at a media facing surface. A non-magnetic metal layer is disposed on the main pole, wherein the non-magnetic metal layer is recessed from the media facing surface. The non-magnetic metal layer overlaps with a portion of the conducting gap.

The write head may further comprise a trailing gap disposed adjacent to the conducting gap. The trailing gap and the conducting gap may comprise different materials.

While the foregoing is directed to embodiments of the present disclosure, other and further embodiments of the disclosure may be devised without departing from the basic scope thereof, and the scope thereof is determined by the claims that follow.

What is claimed is:
1. A write head, comprising:
  a trailing shield;
  a main pole disposed adjacent to the trailing shield;

a first current blocker disposed on the main pole, wherein the first current blocker is disposed at a media facing surface;

a conducting gap disposed adjacent to the first current blocker and recessed from the media facing surface, wherein the first current blocker is configured to recess the conducting gap away from the media facing surface; and a non-magnetic metal layer disposed between the main pole and the trailing shield, wherein the non-magnetic metal layer is disposed between the conducting gap and the trailing shield.

2. The write head of claim 1, wherein the conducting gap is conformal with the main pole.

3. The write head of claim 1, wherein the conducting gap is non-conformal with the main pole.

4. The write head of claim 1,
wherein the non-magnetic metal layer is recessed from the media facing surface, wherein the non-magnetic metal layer overlaps with a portion of the first current blocker, and wherein the non-magnetic metal layer is disposed in contact with the conducting gap.

5. The write head of claim 1, wherein a width of the first current blocker extends from the main pole to the trailing shield.

6. The write head of claim 1, further comprising a trailing gap disposed between the main pole and the non-magnetic metal layer, the trailing gap being recessed from the media facing surface, wherein the trailing gap is in contact with a first surface of the conducting gap.

7. The write head of claim 6, wherein the first current block is in contact with a second surface of the conducting gap opposite to the first surface of the conducting gap, and wherein a distance from the first surface to the second surface of the conducting gap defines an electrical stripe height.

8. The write head of claim 7, wherein the first current blocker defines a magnetic stripe height from the media facing surface to the conducting gap, and wherein the electrical stripe height is longer than the magnetic stripe height.

9. A storage device, comprising:
a write head, the write head comprising:
a trailing shield;
a main pole disposed adjacent to the trailing shield;
a first current blocker disposed on the main pole, wherein the first current blocker is disposed at a media facing surface;
a conducting gap disposed adjacent to the first current blocker and recessed from the media facing surface, wherein the first current blocker is configured to recess the conducting gap away from the media facing surface; and
a non-magnetic metal layer disposed between the main pole and the trailing shield, wherein the non-magnetic metal layer is disposed between the conducting gap and the trailing shield.

10. The storage device of claim 9, wherein the write head further comprises a trailing gap disposed between the main pole and the trailing shield, the trailing gap being recessed from the media facing surface, wherein the current blocker defines a magnetic stripe height from the media facing surface to the conducting gap, and wherein the conducing gap defines an electrical stripe height from the current blocker to a trailing gap.

11. The storage device of claim 10, wherein the electrical stripe height is longer than the magnetic stripe height.

12. The storage device of claim 10, wherein the conducting gap has a shorter length than the trailing gap, and wherein the trailing gap has a shorter length than the non-magnetic metal layer.

13. The storage device of claim 10, wherein the trailing gap and the conducting gap have a same width.

14. The storage device of claim 9, wherein the conducting gap is conformal with the main pole such that the conducting gap and the main pole have substantially the same shape.

15. A write head, comprising:
a trailing shield;
a main pole disposed adjacent to the trailing shield;
a current blocker disposed on the main pole, the current blocker comprising a first surface disposed at a media facing surface and a second surface opposite the first surface, wherein a distance from the first surface to the second surface of the current blocker defines a magnetic stripe height;
a conducting gap disposed on the main pole recessed from the media facing surface, the conducting gap comprising a third surface in contact with the second surface of the current blocker and a fourth surface opposite the third surface, wherein a distance from the third surface to the fourth surface of the conducting gap defines an electrical stripe height; and
a non-magnetic metal layer recessed from the media facing surface, wherein the non-magnetic metal layer is disposed in contact with the conducting gap, the current blocker, and the trailing shield.

16. The write head of claim 15, wherein the electrical stripe height is longer than the magnetic stripe height.

17. The write head of claim 15, wherein the conducting gap is conformal with the main pole such that the conducting gap and the main pole have substantially the same shape.

18. The write head of claim 15, further comprising a trailing gap disposed between the main pole and the trailing shield recessed from the media facing surface, the trailing gap being in contact with the fourth surface of the conducting gap, wherein the trailing gap has a shorter length than the non-magnetic metal layer.

19. The write head of claim 15, wherein the conducting gap is non-conformal with the main pole.

20. The write head of claim 15, wherein a width of the current blocker extends from the main pole to the trailing shield, and wherein the non-magnetic metal layer overlaps with a portion of the current blocker.

* * * * *